(12) United States Patent
Horn et al.

(10) Patent No.: US 12,439,391 B2
(45) Date of Patent: Oct. 7, 2025

(54) CHANNEL AWARE TONE RESERVATION

(71) Applicant: QUALCOMM Incorporated, San Diego, CA (US)

(72) Inventors: Idan Michael Horn, Hod Hasharon (IL); Danlu Zhang, Rancho Santa Fe, CA (US); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 653 days.

(21) Appl. No.: 17/353,315

(22) Filed: Jun. 21, 2021

(65) Prior Publication Data

US 2022/0408438 A1 Dec. 22, 2022

(51) Int. Cl.
| | |
|---|---|
| *H04W 72/0453* | (2023.01) |
| *H04B 7/0413* | (2017.01) |
| *H04L 5/00* | (2006.01) |
| *H04W 24/10* | (2009.01) |
| *H04W 72/542* | (2023.01) |

(52) U.S. Cl.
CPC ...... *H04W 72/0453* (2013.01); *H04B 7/0413* (2013.01); *H04W 24/10* (2013.01); *H04W 72/542* (2023.01)

(58) Field of Classification Search
None
See application file for complete search history.

(56) References Cited

U.S. PATENT DOCUMENTS

| | | | |
|---|---|---|---|
| 10,644,916 B1 * | 5/2020 | Shattil | H04L 27/2614 |
| 11,902,214 B2 * | 2/2024 | Park | H04L 1/0016 |
| 2013/0077661 A1 * | 3/2013 | Jacobsen | H04L 27/0008 375/219 |
| 2014/0307816 A1 * | 10/2014 | Alex | H04L 25/0202 375/267 |
| 2017/0054583 A1 * | 2/2017 | Pratt | H04L 25/0204 |
| 2017/0288759 A1 * | 10/2017 | Namgoong | H04L 25/0212 |
| 2017/0347340 A1 * | 11/2017 | Haley | H04L 25/03343 |
| 2018/0270730 A1 * | 9/2018 | Martin | H04W 36/0088 |
| 2019/0058513 A1 * | 2/2019 | Mizusawa | H04B 7/0617 |
| 2020/0022120 A1 * | 1/2020 | Liu | H04B 7/0473 |
| 2020/0076670 A1 * | 3/2020 | Liu | H04L 1/1664 |
| 2020/0404630 A1 * | 12/2020 | Gustafsson | H04L 1/1896 |
| 2021/0329614 A1 * | 10/2021 | Park | H04L 1/0009 |
| 2023/0036558 A1 * | 2/2023 | Ren | H04L 27/2636 |
| 2023/0109359 A1 * | 4/2023 | Back | H04L 27/26 370/329 |
| 2023/0327934 A1 * | 10/2023 | El Hamss | H04L 27/2618 370/329 |
| 2023/0420470 A1 * | 12/2023 | Ooi | G02B 6/305 |

* cited by examiner

*Primary Examiner* — Jeffrey M Rutkowski
*Assistant Examiner* — Ning Li
(74) *Attorney, Agent, or Firm* — Harrity & Harrity, LLP/Qualcomm

(57) ABSTRACT

Various aspects of the present disclosure generally relate to wireless communication. In some aspects, a transmitter device may obtain an estimate of a transmission channel. The transmitter device may transmit, via the transmission channel, a communication having tone reservation applied to tone reservation (TR) subcarriers based at least in part on parameters of the transmission channel. Numerous other aspects are described.

30 Claims, 8 Drawing Sheets

CHANNEL AWARE TONE RESERVATION

FIELD OF THE DISCLOSURE

Aspects of the present disclosure generally relate to wireless communication and to techniques and apparatuses for channel aware tone reservation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a transmitter device for wireless communication includes a memory; and one or more processors, coupled to the memory, configured to: obtain an estimate of a transmission channel; and transmit, via the transmission channel, a communication having tone reservation applied to tone reservation (TR) subcarriers based at least in part on parameters of the transmission channel.

In some aspects, a non-transitory computer-readable medium stores a set of instructions for wireless communication includes one or more instructions that, when executed by one or more processors of a transmitter device, cause the transmitter device to: obtain an estimate of a transmission channel; and transmit, via the transmission channel, a communication having tone reservation applied to TR subcarriers based at least in part on parameters of the transmission channel.

In some aspects, an apparatus for wireless communication includes means for obtaining an estimate of a transmission channel; and means for transmitting, via the transmission channel, a communication having tone reservation applied to TR subcarriers based at least in part on parameters of the transmission channel.

In some aspects, a method of wireless communication performed by a transmitter device includes obtaining an estimate of a transmission channel; and transmitting, via the transmission channel, a communication having tone reservation applied to TR subcarriers based at least in part on parameters of the transmission channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
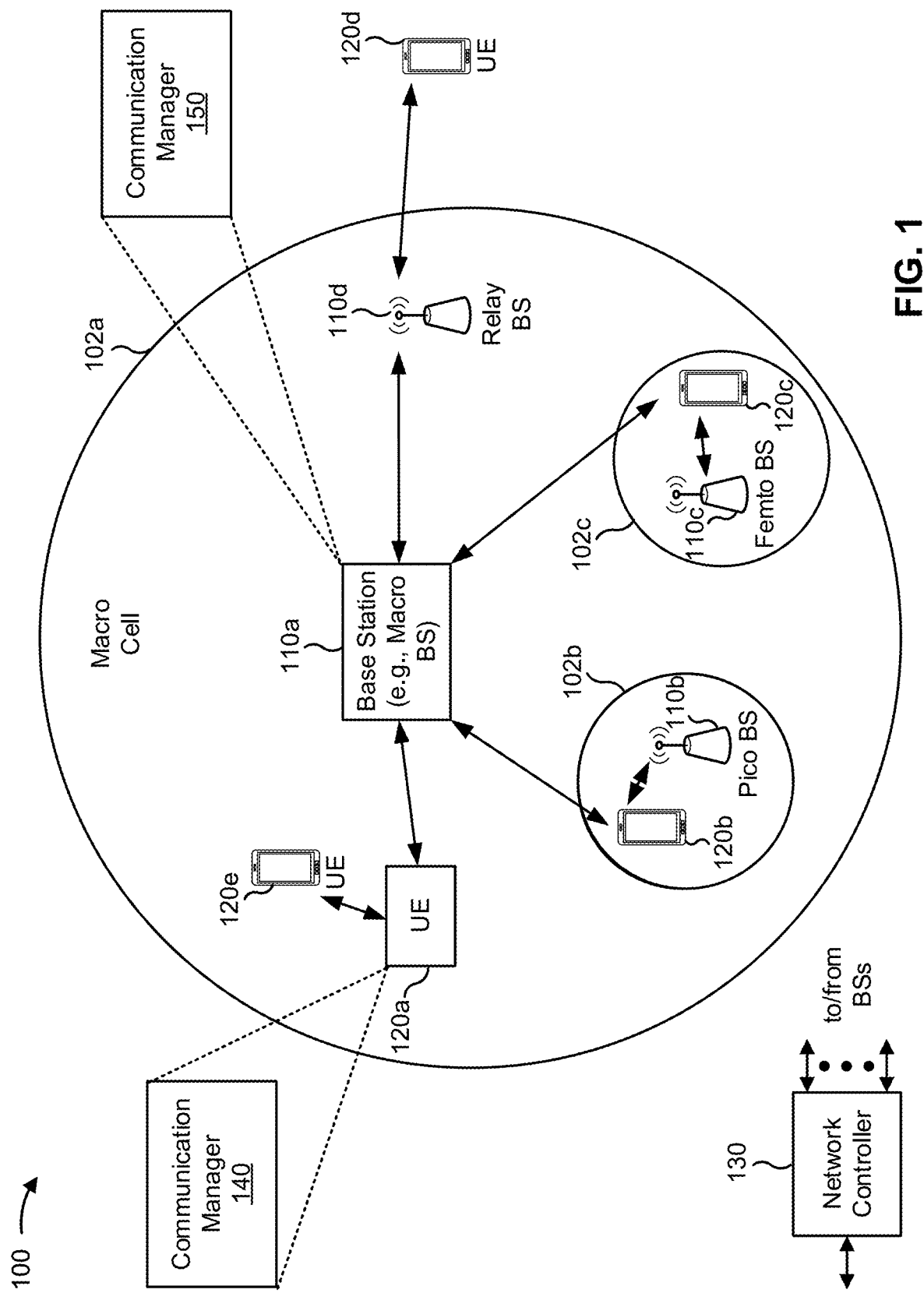
FIG. 1 is a diagram illustrating an example of a wireless network, in accordance with the present disclosure.

Tone reservation (TR) (e.g., foregoing transmission of data on one or more subcarriers of a communication and/or transmitting a signal to improve a peak-to-average-power ratio (PAPR) of the communication on the one or more subcarriers, among other examples) may be used by a transmitting device to improve PAPR of a communication to a receiving device. This may improve a likelihood of decoding and/or demodulating the communication by the receiving device. Tone reservation may be applied to fixed subcarriers, which reduces throughput on the communication and may replace data on high-energy subcarriers that have a relatively high likelihood of being decoded and demodulated by the receiving device. Alternatively, tone reservation may be applied to subcarriers that are based at least in part on energies of the subcarriers as expected to be received by the receiving device (e.g., using low energy subcarriers). However, signaling for use of tone reservation may consume resources as overhead, which may decrease throughput and/or spectral efficiency.

In some aspects described herein, a transmitting device may obtain an estimate of a transmission channel. The transmitting device may transmit, via the transmission channel, a communication having tone reservation applied to TR subcarriers based at least in part on parameters of the transmission channel. For example, the transmitting device may receive and measure the one or more signals, such as a set of reference signals from a receiving device. The transmitting device may determine which subcarriers should be used for tone reservation based at least in part on the measurements of the one or more uplink signals and/or an assumption of relatively high reciprocity between transmission and reception channels. The transmitting device may transmit the communication with tone reservation applied to subcarriers based at least in part on parameters of the transmission channel. The receiving device may receive the communication having the tone reservation applied without knowing that the tone reservation was applied by the transmitting device.

In this way, the transmitting device may use tone reservation on one or more low-energy subcarriers, which may minimally decoding by the receiving device, to improve PAPR of the communication. Additionally, the transmitting device may use tone reservation without the need to transmit an indication to the receiving device that tone reservation is applied. This may reduce overhead associated with the use of tone reservation by obviating the need to transmit reports for tone reservation, which may increase throughput between the transmitting device and the receiving device. Improved PAPR may conserve resources that the receiving device uses to receive (e.g., demodulate and/or decode) the communication and may also lead to improved efficiency of power amplification at the transmitting device (e.g., by conserving power that would otherwise be used to transmit signals using the reserved subcarriers).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz—300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the transmitter device may include a communication manager 140 or 150. As described in more detail elsewhere herein, the communication manager 808 may obtain an estimate of a transmission channel; and transmit, via the transmission channel, a communication having tone reservation applied to TR subcarriers based at least in part on parameters of the transmission channel. Additionally, or alternatively, the communication manager 808 may perform one or more other operations described herein.

As indicated above, FIG. 1 is provided as an example. Other examples may differ from what is described with regard to FIG. 1.

Figure 2:
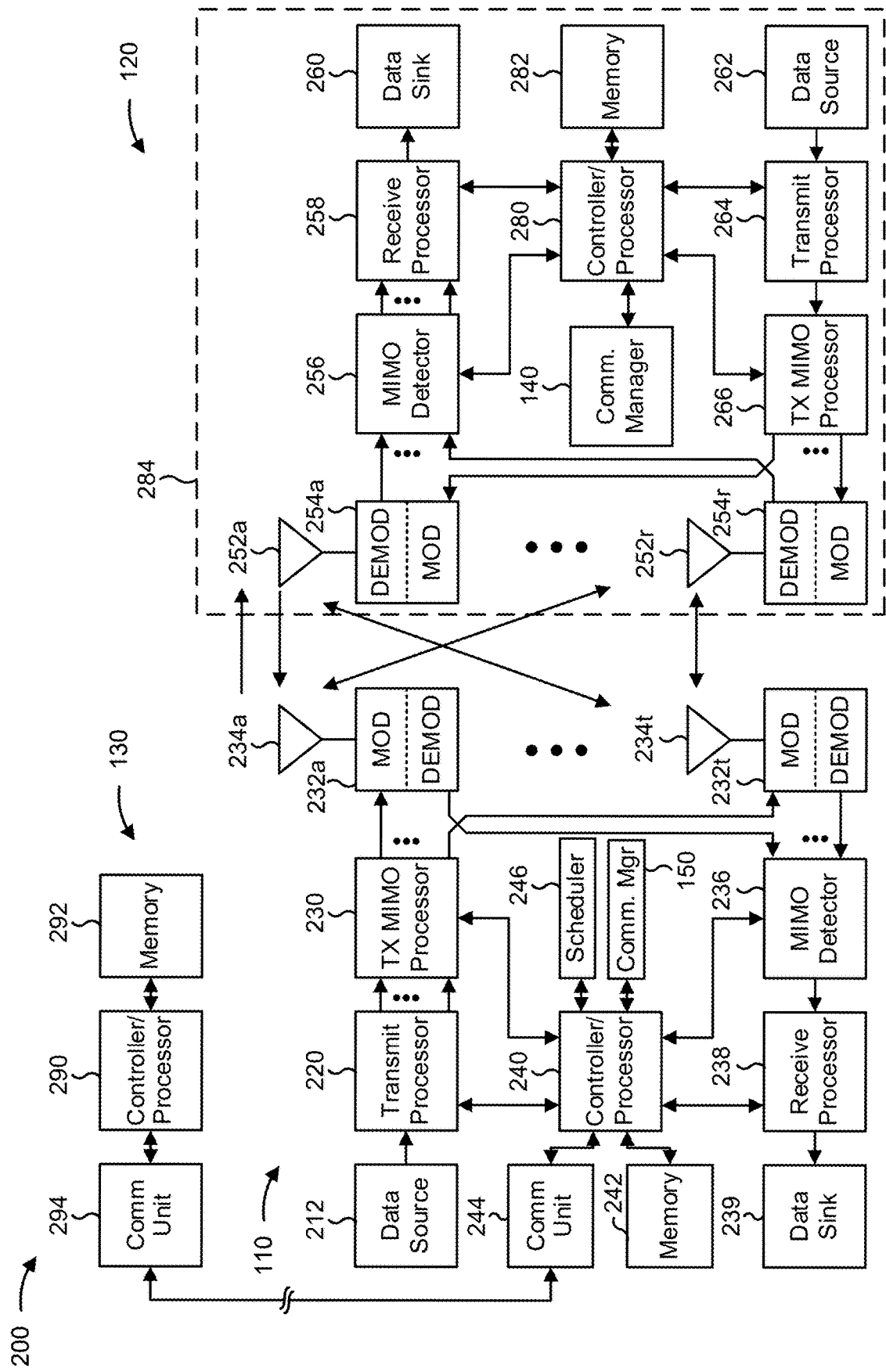
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with channel aware tone reservation, as described in more detail elsewhere herein. In some aspects, the transmitting device described herein is the base station or the UE 120 or includes one or more components of the base station 110 or the UE 120 shown in FIG. 2. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, the transmitter device includes means for obtaining an estimate of a transmission channel; and/or means for transmitting, via the transmission channel, a communication having tone reservation applied to TR subcarriers based at least in part on parameters of the transmission channel. In some aspects, the means for the transmitter device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the transmitter device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
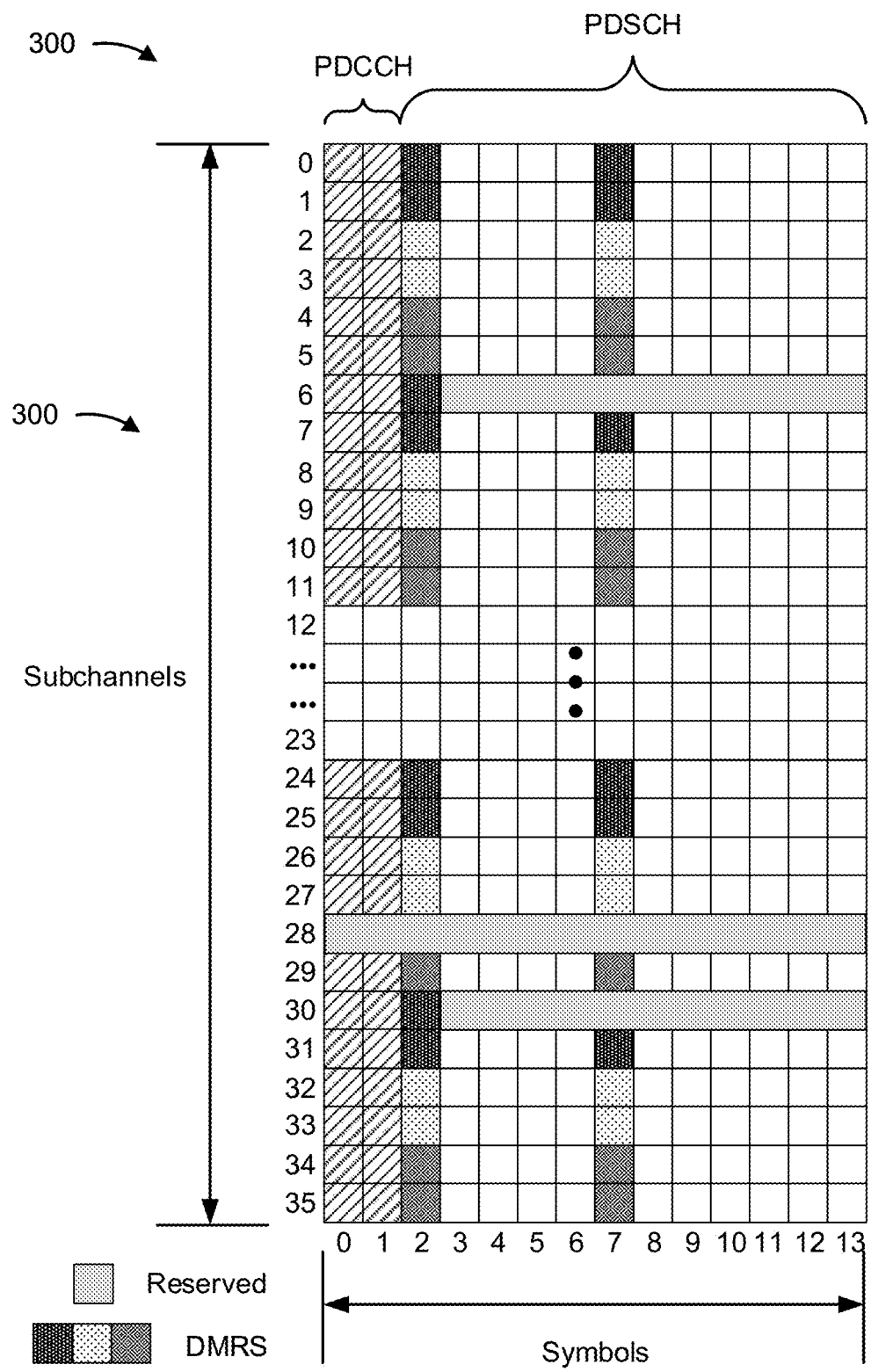
FIG. 3 is a diagram illustrating an example of tone reservation, in accordance with the present disclosure.

FIG. 3 is a diagram illustrating an example 300 of UE subcarrier tone reservation on one or more subcarriers, in accordance with the present disclosure. In some networks, a base station may transmit a downlink transmission on a physical downlink shared channel (PDSCH) with tone reservation on one or more subcarriers based at least in part on measurement(s) of uplink signals from a UE, a request from the UE, an indication of a capability of the UE, and/or an independent determination by the base station, among other examples (e.g., as described herein).

In some aspects, the UE may be configured to communicate with the base station with a configuration for tone reservation. For example, the configuration may be common for multiple communications (e.g., for a configured grant and/or semi-persistent scheduling resources), multiple UEs connected to the base station, a beam provided by the base station, a cell provided by the base station, and/or the like.

As shown by example 300, a PDSCH may include one or more reserved subcarriers (e.g., tones) on which data and/or pilots are not to be transmitted. In some aspects, the subcarriers may be empty (e.g., not having any information intended for transmission to the UE). Additionally, or alternatively, tone reservation may be applied to physical downlink control channel (PDCCH) symbols (e.g., symbols 0 and 1 in FIG. 3). In some aspects, a pilot may include or may be a reference signal. In some aspects, the base station may transmit a signal that is configured to improve a PAPR for a downlink transmission on the PDSCH by using tone reservation to forego transmission of data and/or pilots on the one or more reserved subcarriers. While example 300 provides an example of tone reservation applied to PDSCH and/or PDCCH, in some aspects (e.g., when a UE applies tone reservation to uplink communications transmitted to a base station), tone reservation may be applied to physical uplink shared channel (PUSCH) and/or physical uplink control channel (PUCCH) symbols.

Signaling for use of tone reservation may consume resources as overhead, which may decrease throughput and/or spectral efficiency. For example, to enable the UE to identify which subcarriers have tone reservation applied, the base station may indicate the frequency locations (e.g., using indices) of the subcarriers to the UE. These indications may consume communication, network, and power resources. Additionally, or alternatively, consumption of network resources for the indications may decrease throughput available for data (e.g., associated with the PDSCH). In a communication where tone reservation is not used, an increase in PAPR may occur, which may degrade communications between the base station and the UE, and may negatively affect an efficiency of power amplification at the base station. Based at least in part on degradation of the communications, the UE and/or the base station may consume power, communication, network, and computing resources to detect and/or correct communication errors associated with the degradation.

As indicated above, FIG. 3 is provided as an example. Other examples may differ from what is described with respect to FIG. 3.

In some aspects described herein, a transmitting device may obtain an estimate of a transmission channel. The transmitting device may transmit, via the transmission channel, a communication having tone reservation applied to TR subcarriers based at least in part on parameters of the transmission channel. For example, the transmitting device may receive and measure the one or more signals, such as a set of reference signals from a receiving device. The transmitting device may determine which subcarriers should be used for tone reservation based at least in part on the measurements of the one or more uplink signals and/or an assumption of relatively high reciprocity between transmission and reception channels. The transmitting device may transmit the communication with tone reservation applied to subcarriers based at least in part on parameters of the transmission channel. The receiving device may receive the communication having the tone reservation applied without knowing that the tone reservation was applied by the transmitting device.

In this way, the transmitting device may use tone reservation on one or more low-energy subcarriers, which may minimally impact decoding by the receiving device, to improve a PAPR of the communication. Additionally, the transmitting device may use tone reservation without the need to transmit an indication to the receiving device that tone reservation is applied. This may reduce overhead associated with the use of tone reservation by obviating the need to transmit reports for tone reservation, which may increase throughput between the transmitting device and the receiving device. Improved PAPR may conserve resources that the receiving device uses to receive (e.g., demodulate and/or decode) the communication and may also lead to improved efficiency of power amplification at the transmitting device (e.g., by conserving power that would otherwise be used to transmit signals using the reserved subcarriers).

Figure 4:
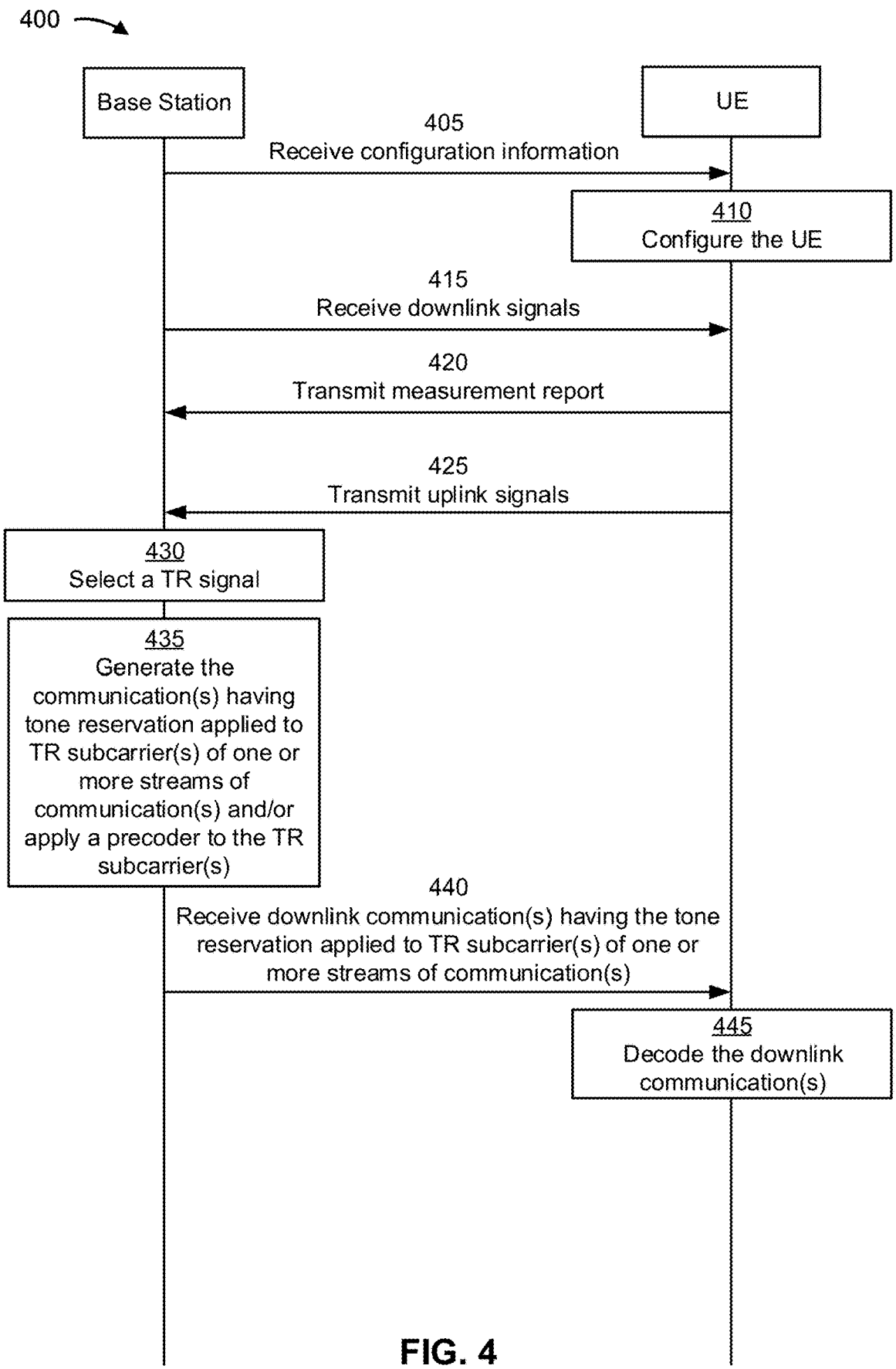
FIGS. 4-6 are diagrams illustrating examples associated with channel aware tone reservation, in accordance with the present disclosure.

FIG. 4 is a diagram illustrating an example 400 associated with channel aware tone reservation, in accordance with the present disclosure. As shown in FIG. 4, a base station (e.g., base station 110) may communicate with a UE (e.g., UE 120). In some aspects, the base station and the UE may be part of a wireless network (e.g., wireless network 100). As shown in FIG. 4, the base station may apply tone reservation for downlink communications.

As shown by reference number 405, the base station may transmit, and the UE may receive, configuration information. In some aspects, the UE may receive the configuration information via one or more of radio resource control (RRC) signaling, medium access control (MAC) control elements (CEs) (MAC CEs), and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to receive one or more downlink communications having tone reservation without receiving an indication that tone reservation has been applied. In some aspects, the configuration information may indicate that the UE is to decode the one or more downlink communications based at least in part on using samples measured on all subcarriers of the one or more downlink communications. In some aspects, the UE may be configured to receive the one or more downlink communications having tone reservation without receiving an indication that tone reservation has been applied based at least in part on the UE failing to report a capability to identify the one or more TR subcarriers within the one or more downlink communication.

As shown by reference number 410, the UE may configure the UE based at least in part on the configuration information. In some aspects, the UE may be configured to perform one or more operations described herein based at least in part on the configuration information.

As shown by reference number 415, the base station may transmit, and the UE may receive, one or more downlink signals, such as one or more downlink reference signals. In some aspects, the base station may transmit one or more channel state information reference signals (CSI-RSs) and/or one or more synchronization signal blocks (SSBs), among other examples, for the UE to measure. The UE may measure the one or more downlink signals to determine one or more signal to interference plus noise ratios (SINRs) associated with one or more channels via which the UE receives communications from the base station.

As shown by reference number 420, the UE may transmit, and the base station may receive, a measurement report. In some aspects, the UE may transmit, and the base station may receive, a measurement of one or more SINRs that are based at least in part on reception of the one or more downlink signals. In some aspects, the base station may determine whether to use tone reservation for subsequent downlink communications based at least in part on the measurement report. For example, the base station may determine to use tone reservation based at least in part on a relatively low SINR (e.g., less than or equal to a threshold) and/or may determine to not use tone reservation based at least in part on a relatively high SINR (e.g., greater than or equal to a threshold). In some aspects, the base station may determine an amount (e.g., a level or a degree) of tone reservation to apply based at least in part on the measurement report. For example, the base station may determine a number of subcarriers to which tone reservation is to be applied, a fraction of subcarriers to which tone reservation is to be applied, or a threshold power for subcarriers to which tone reservation is to be applied based at least in part on the one or more SINRs indicated in the measurement report.

As shown by reference number 425, the UE may transmit, and the base station may receive, one or more uplink signals. In some aspects, the one or more uplink signals may be transmitted by the UE for measurement by the base station (e.g., to enable the base station to identify subcarriers to which tone reservation is to be applied). In some aspects, the one or more uplink signals include one or more sounding reference signals (SRSs). In some aspects, the base station may assume reciprocity of between an uplink channel and a downlink channel, and may estimate the downlink channel based at least in part on the one or more uplink signals.

In some aspects, the base station may receive an indication of spatial reception parameters for reception of a downlink communication by the UE. In some aspects, the UE may transmit an indication of a joint quasi co-location (QCL) type D between uplink and downlink communications.

As shown by reference number 430, the base station may select a tone reservation signal (TR signal). In some aspects, the base station may select the TR signal to apply to the TR subcarriers based at least in part on the parameters of a transmission channel (e.g., a downlink channel), such as energies and/or capacities associated with subchannels, including the TR subchannels, of the one or more downlink communications. For example, the TR signal may be configured to reduce a PAPR of the one or more downlink communications when transmitted on the TR subcarriers. In some aspects, the base station may configure a power amplifier associated with transmission of the TR signal to improve a PAPR of the one or more downlink communications. Additionally, or alternatively, the base station may select the TR signal to reduce interference between streams of a MIMO communication.

As shown by reference number 435, the base station may generate the one or more communications having tone reservation applied to the one or more TR subcarriers of one or more streams of the one or more communications and/or may apply a precoder to the one or more TR subcarriers. In some aspects, the base station may generate the one or more communications as single input single output communications (SISO) communications or as MIMO communications with multiple steams.

The base station may apply the tone reservation to the one or more TR subcarriers based at least in part on received energy on the one or more uplink signals. In some aspects, the base station may determine channel conditions (e.g., received energy measurements, SINR one or more values, and/or one or more PAPR values, among other examples) based at least in part on the one or more uplink signals and apply tone reservation based at least in part on the channel conditions. In some aspects, the base station may apply tone reservation to the one or more subcarriers based at least in part on the one or more subcarriers having a lowest received energy of subcarriers of the one or more uplink signals. In some aspects, the base station may apply tone reservation based at least in part on receiving the indication of the measurement of one or more SINRs (e.g., the measurement report described in connection with reference number 420) and/or based at least in part on transmission of one or more downlink reference signals (e.g., the downlink signals described in connection with reference number 415).

In some aspects, the base station may apply tone reservation to the one or more TR subchannels based at least in part on a configured number of subcarriers to which tone reservation is to be applied, a configured fraction (e.g., percentage) of subcarriers to which tone reservation is to be applied, and/or a configured threshold power for subcarriers to which tone reservation is to be applied, among other examples. For example, the base station may apply tone reservation to N subcarriers with the lowest energy, capacity, and/or power (e.g., based on signal-to-noise ratio (SNR) measurements, SINR measurements, and/or RSSI measurements), where N is a positive integer. As another example, the base station may apply tone reservation to a fraction or percentage (e.g., one fourth, one tenth, 5%, 10%, 20%, or the like) of subcarriers (e.g., subcarriers in the bottom fourth, tenth, 5%, 10%, 20%, or the like, in energy and/or power). As yet another example, the base station may apply tone reservation to TR subcarriers satisfying a threshold power (e.g., 0 dB, −5 dB, −10 dB, or the like).

In some aspects, the base station may apply tone reservation according to a tone reservation optimization technique or formula. For example, based at least in part on the number of subcarriers, the fraction of subcarriers, and/or the threshold power for subcarriers to which tone reservation is to be applied, an optimization technique may be implemented to identify subcarriers for tone reservation in a manner that optimizes PAPR with a constraint of a maximum power (e.g., transmit power) that is equal to the power used for the PDSCH and/or PDCCH subcarrier. In some aspects, the indication may include information that indicates that tone reservation optimization techniques are to be performed in iterations, are to be generated by applying machine learning, are to be generated using constrained or unconstrained optimization, or are to be generated by testing hypothesis iterations, among other examples.

In some aspects, the base station may apply tone reservation to a number of subcarriers, a fraction (e.g., percentage) of subcarriers, and/or based at least in part on a threshold power for subcarriers, among other examples (e.g., as described herein). In some aspects, the base station may apply tone reservation using a tone reservation optimization technique (e.g., as described herein). In some aspects, the base station may apply tone reservation based at least in part on a PAPR threshold and/or various tone reservation and/or optimization techniques to be iteratively used until the PAPR threshold is satisfied (e.g., as described herein).

In some aspects, the base station may apply the precoder to the one or more TR subcarriers of one or more streams before performing digital precoding of the communication on multiple streams, after performing digital precoding of the communication on multiple streams, and/or to improve self-interference of multiple streams and a peak-to-average-power-ratio of the communication.

In some aspects, the base station may generate the communication having tone reservation applied to the TR subcarriers (e.g., may select the one or more TR subcarriers for tone reservation) based at least in part on parameters associated with the one or more TR subcarriers on multiple streams. In some aspects, the base station may generate the communication having tone reservation applied to the TR subcarriers based at least in part on one or more parameters associated with a likelihood of the UE decoding data that would otherwise be carried on the one or more TR subcarriers. For example, the parameters may include channel capacity percentiles associated with the TR subcarriers, capacities of the TR subcarriers, energy percentiles associated with the TR subcarriers, energies of the TR subcarriers, channel covariance determinants of the TR subcarriers, channel covariance condition numbers of the TR subcarriers, and/or channel covariance eigenvalues of the TR subcarriers, among other examples. In this way, the base station may account for energies on the TR subcarriers and interference between streams of the one or more downlink communications, among other examples.

As shown by reference number 440, the base station may transmit, and the UE may receive, one or more downlink communications having the tone reservation applied to the one or more TR subcarriers of one or more streams of the one or more communications. In some aspects, the one or more TR subcarriers to which tone reservation is applied (e.g., by the base station) are based at least in part on the measurement of the one or more uplink signals on the one or more subcarriers (e.g., as described herein). In some aspects, the base station may transmit the one or more downlink communications having the tone reservation on the TR subcarriers having an estimated lowest received energy and/or lowest capacity of subcarriers of the one or more downlink communications.

As shown by reference number 445, the UE may decode the one or more downlink communications without awareness of the tone reservation being applied to the one or more TR subcarriers As indicated above, FIG. 4 is provided as an example. Other examples may differ from what is described with respect to FIG. 4.

Figure 5:
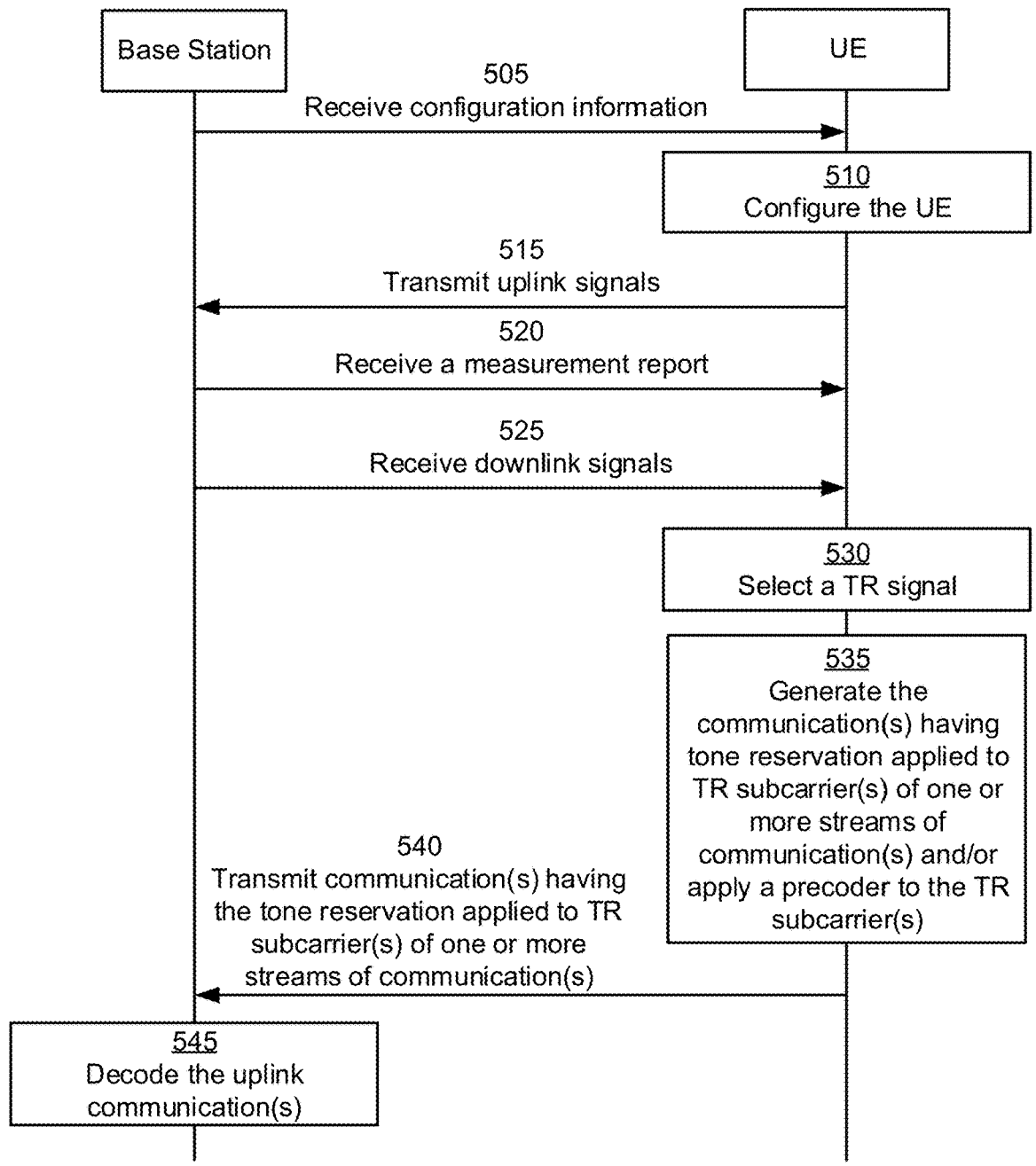

FIG. 5 is a diagram illustrating an example 500 of channel aware tone reservation, in accordance with the present disclosure. As shown in FIG. 5, a base station (e.g., base station 110) may communicate with a UE (e.g., UE 120). In some aspects, the base station and the UE may be part of a wireless network (e.g., wireless network 100). As shown in FIG. 5, the UE may apply tone reservation for uplink communications.

As shown by reference number 505, the UE may receive, and the base station may transmit configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE permitted to transmit one or more uplink communications having tone reservation applied without transmitting an indication to the base station that the tone reservation is applied.

As shown by reference number 510, the UE may configure the UE based at least in part on the configuration information. In some aspects, the UE may be configured to perform one or more operations described herein based at least in part on the configuration information.

As shown by reference number 515, the UE may transmit, and the base station may receive, one or more uplink signals. In some aspects, the one or more uplink signals may be transmitted by the UE for measurement by the base station (e.g., to enable the base station to generate a measurement report). In some aspects, the one or more uplink signals include one or more SRSs.

As shown by reference number 520, the base station may transmit, and the UE may receive, a measurement report. In some aspects, the base station may transmit, and the UE may receive, a measurement of one or more SINRs that are based at least in part on reception of the one or more uplink signals. In some aspects, the UE may determine whether to use tone reservation for subsequent downlink communications based at least in part on the measurement report. For example, the UE may determine to use tone reservation based at least in part on a relatively low SINR (e.g., less than or equal to a threshold) and/or may determine to not use tone reservation based at least in part on a relatively high SINR (e.g., greater than or equal to a threshold). In some aspects, the UE may determine an amount (e.g., a level or a degree) of tone reservation to apply based at least in part on the measurement report. For example, the UE may determine a number of subcarriers to which tone reservation is to be applied, a fraction of subcarriers to which tone reservation is to be applied, or a threshold power for subcarriers to which tone reservation is to be applied based at least in part on the one or more SINRs indicated in the measurement report.

As shown by reference number 525, the UE may receive, and the base station may transmit, one or more downlink signals. In some aspects, the one or more downlink signals may be transmitted by the base station for measurement by the UE (e.g., to enable the UE to identify subcarriers to which tone reservation is to be applied). In some aspects, the one or more downlink signals may include one or more CSI-RSs, SSBs, or data channel signaling, among other examples. In some aspects, the UE may estimate a channel based at least in part on DMRSs within a data channel and/or within a control channel to estimate a downlink channel. For example, the UE may estimate the channel (e.g., the uplink channel) based at least in part on an assumption of reciprocity with the downlink channel, and may estimate the uplink channel based at least in part on the one or more downlink signals.

In some aspects, the UE may receive an indication of spatial reception parameters for reception of an uplink communication by the base station. In some aspects, the base station may transmit an indication of a joint quasi co-location (QCL) type D between uplink and downlink communications.

As shown by reference number 530, the UE may select a TR signal. In some aspects, the UE may select the TR signal to apply to the TR subcarriers based at least in part on the parameters of a transmission channel (e.g., an uplink channel), such as energies and/or capacities associated with subchannels, including the TR subchannels, of the one or more uplink communications. For example, the TR signal may be configured to reduce a PAPR of the one or more uplink communications when transmitted on the TR subcarriers. In some aspects, the UE may configure a power amplifier associated with transmission of the TR signal to improve a PAPR of the one or more uplink communications. Additionally, or alternatively, the UE may select the TR signal to reduce interference between streams of a MIMO communication.

As shown by reference number 535, the UE may generate the one or more communications having tone reservation applied to the one or more TR subcarriers of one or more streams of the one or more communications and/or may apply a precoder to the one or more TR subcarriers. In some aspects, the UE may generate the one or more communications as SISO communications or as MIMO communications with multiple steams.

The UE may apply the tone reservation to the one or more TR subcarriers based at least in part on received energy on the one or more uplink signals. In some aspects, the UE may determine channel conditions (e.g., received energy measurements, one or more SINR values, and/or one or more PAPR values, among other examples) based at least in part on the one or more uplink signals and apply tone reservation based at least in part on the channel conditions. In some aspects, the UE may apply tone reservation to the one or more TR subcarriers based at least in part on the one or more subcarriers having a lowest received energy of subcarriers of the one or more uplink signals. In some aspects, the UE may apply tone reservation based at least in part on receiving the indication of the measurement of one or more SINRs (e.g., the measurement report described in connection with reference number 520) and/or based at least in part on transmission of one or more uplink reference signals (e.g., the uplink signals described in connection with reference number 515).

In some aspects, the UE may apply tone reservation to the one or more TR subchannels based at least in part on a configured number of subcarriers to which tone reservation is to be applied, a configured fraction (e.g., percentage) of subcarriers to which tone reservation is to be applied, and/or a configured threshold power for subcarriers to which tone reservation is to be applied, among other examples. For example, the UE may apply tone reservation to N subcarriers with the lowest energy, capacity, and/or power (e.g., based on SNR measurements, SINR measurements, and/or RSSI measurements), where N is a positive integer. As another example, the UE may apply tone reservation to a fraction or percentage (e.g., one fourth, one tenth, 5%, 10%, 20%, or the like) of subcarriers (e.g., subcarriers in the bottom fourth, tenth, 5%, 10%, 20%, or the like, in energy and/or power). As yet another example, the UE may apply tone reservation to TR subcarriers satisfying a threshold power (e.g., 0 dB, −5 dB, −10 dB, or the like).

In some aspects, the UE may apply tone reservation according to a tone reservation optimization technique or formula. For example, based at least in part on the number of subcarriers, the fraction of subcarriers, and/or the threshold power for subcarriers to which tone reservation is to be applied, an optimization technique may be designed to identify subcarriers for tone reservation in a manner that optimizes PAPR with a constraint of a maximum power (e.g., transmit power) that is equal to the power used for the PUSCH and/or PUCCH subcarrier. In some aspects, the indication may include information that indicates that tone reservation optimization techniques are to be performed in iterations, are to be generated by applying machine learning, are to be generated using constrained or unconstrained optimization, or are to be generated by testing hypothesis iterations, among other examples.

In some aspects, the UE may apply tone reservation to a number of subcarriers, a fraction (e.g., percentage) of subcarriers, and/or based at least in part on a threshold power for subcarriers, among other examples (e.g., as described herein). In some aspects, the UE may apply tone reservation using a tone reservation optimization technique (e.g., as described herein). In some aspects, the UE may apply tone reservation based at least in part on a PAPR threshold and/or various tone reservation and/or optimization techniques to be iteratively used until the PAPR threshold is satisfied (e.g., as described herein).

In some aspects, the UE may apply the precoder to the one or more TR subcarriers of one or more streams before performing digital precoding of the communication on multiple streams, after performing digital precoding of the communication on multiple streams, and/or to improve self-interference of multiple streams and a peak-to-average-power-ratio of the communication.

In some aspects, the UE may generate the communication having tone reservation applied to the TR subcarriers (e.g., may select the one or more TR subcarriers for tone reservation) based at least in part on parameters associated with the one or more TR subcarriers on multiple streams. In some aspects, the UE may generate the communication having tone reservation applied to the TR subcarriers based at least in part on one or more parameters associated with a likelihood of the base station decoding data that would otherwise be carried on the one or more TR subcarriers. For example, the parameters may include channel capacity percentiles associated with the TR subcarriers, capacities of the TR subcarriers, energy percentiles associated with the TR subcarriers, energies of the TR subcarriers, channel covariance determinants of the TR subcarriers, channel covariance condition numbers of the TR subcarriers, and/or channel covariance eigenvalues of the TR subcarriers, among other examples. In this way, the UE may account for energies on the TR subcarriers and interference between streams of the one or more uplink communications, among other examples.

As shown by reference number 540, the UE may transmit, and the base station may receive, one or more communications having the tone reservation applied to the one or more TR subcarriers of one or more streams of the one or more communications. In some aspects, the one or more TR subcarriers to which tone reservation is applied (e.g., by the UE) are based at least in part on the measurement of the one or more downlink signals on the one or more subcarriers (e.g., as described herein). In some aspects, the UE may transmit the one or more communications having the tone reservation on the TR subcarriers having an estimated lowest received energy and/or lowest capacity of subcarriers of the one or more communications.

As shown by reference number 545, the base station may decode the one or more communications without awareness of the tone reservation being applied to the one or more TR subcarriers As indicated above, FIG. 5 is provided as an example. Other examples may differ from what is described with respect to FIG. 5.

Figure 6:
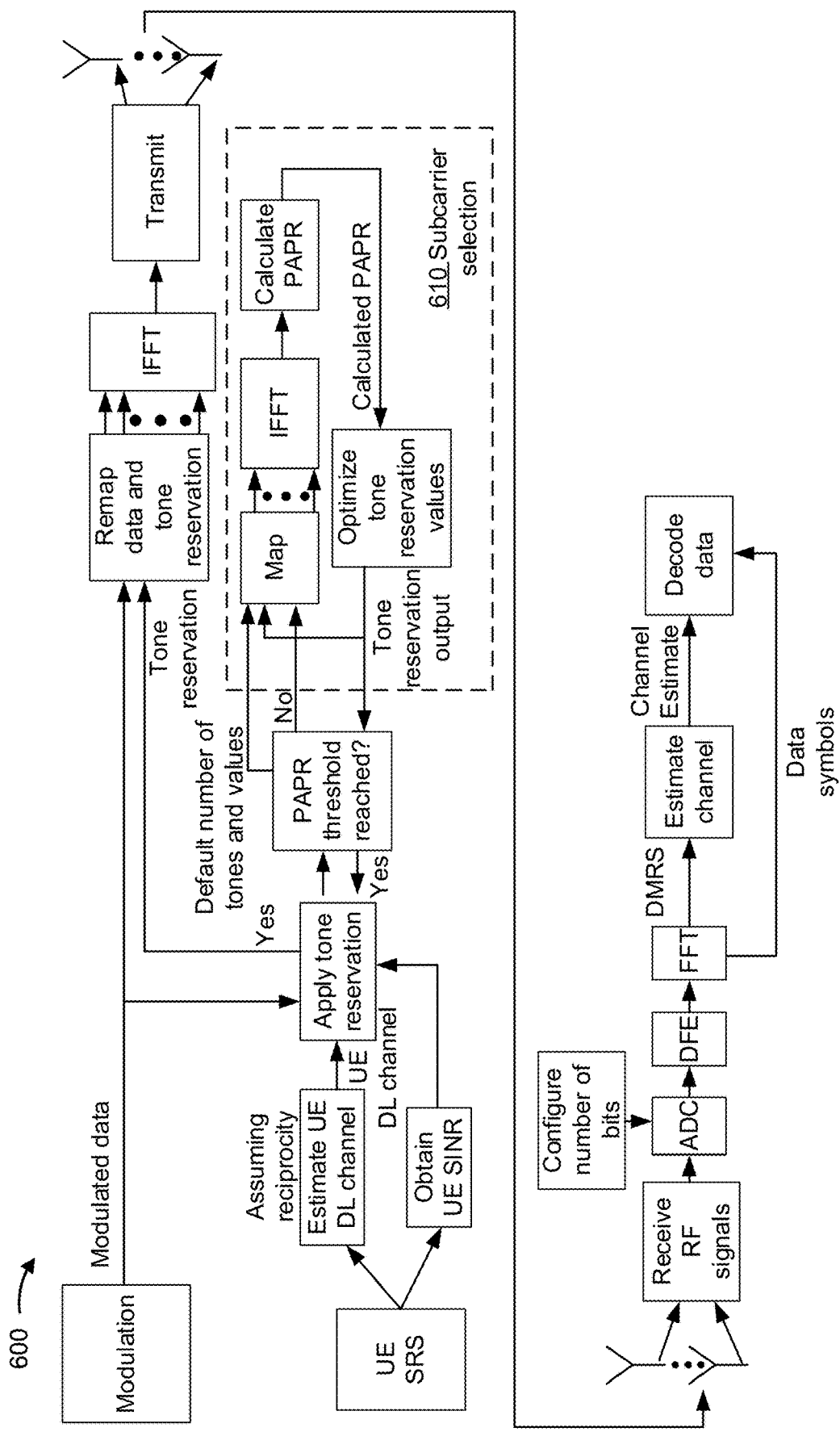

FIG. 6 is a diagram illustrating an example 600 of subcarrier tone reservation, in accordance with the present disclosure. As shown in FIG. 6, tone reservation may be applied to communications transmitted from a base station to a UE.

As shown in example 600, the base station may measure one or more UE SRSs to estimate an uplink channel. The base station may use the estimate of the uplink channel to estimate a downlink channel (e.g., using an assumption of reciprocity between the uplink channel and the downlink channel). In some aspects, the base station may use the estimate of the downlink channel to determine subcarriers to which tone reservation is to be applied.

The base station may determine that tone reservation is to be applied to one or more subcarriers for downlink transmissions to the UE (e.g., based at least in part on an SINR reported by the UE, the uplink channel estimate, other metrics associated with the uplink channel or the downlink channel, network traffic, and/or an amount of data buffered for transmission to the UE). When the base station determines that tone reservation is to be applied, the base station may then determine which subcarriers are to be selected for tone reservation. In some aspects, selection of subcarriers may be based at least in part on a default number, such as the lowest 10% of subcarriers. In some aspects, selection of the default number may be based at least in part on the SINR measurements.

As shown by reference number 610, in some aspects, the base station may iteratively perform subcarrier selection techniques until a threshold PAPR value is reached. For example, the base station may use the UE downlink channel estimate, a default number of tones (e.g., subcarriers), and a default PAPR threshold to perform a selective mapping (SLM) technique, where alternative transmit sequence vectors (e.g., corresponding to the UE downlink channel) are generated from the same data source by multiplying the vectors by a random or pseudo-random phase. After multiplication, inverse fast Fourier transform (IFFT) may be performed on the vectors to convert the corresponding signal from the frequency domain to the time domain, and PAPR values may be determined for each of the vectors. The PAPR values may be compared to one another in a manner designed to optimize tone reservation values by identifying a vector having tone reservations that result in a relatively low, or lowest, PAPR value with respect to other vectors. The base station may then determine whether the PAPR threshold is satisfied by the tone reservations indicated in the identified vector.

In some aspects, the subcarrier selection process may be performed up to k iterations, where k is a positive integer, and/or until a PAPR value that satisfies the threshold is reached. For example, if a default value (e.g., an initial value) for the number of subcarriers to which tone reservation is to be applied is 5%, and the subcarrier selection output fails to satisfy the PAPR threshold by applying tone reservation to the lowest 5% of subcarriers, the base station may increase the default value (e.g., by a fixed amount, variable amount, or fixed rate) and perform SLM again to determine if reserving the increased number of subcarriers (e.g., the lowest 6%) will satisfy the PAPR threshold. In some aspects, the PAPR threshold may be modified (e.g., lowered to decrease the number of subcarriers that would be reserved, or raised to increase the number of subcarriers that would be reserved) when iterating through the subcarrier selection process.

Once a tone reservation satisfying the PAPR threshold is identified, the base station may use the identified tone reservation and modulated data to remap the modulated data using the identified tone reservation scheme (e.g., application of tone reservation on the identified subchannels). For example, in a situation where the subcarrier selection process indicates that the lowest 6% of subcarriers (e.g., in terms of SINR) should be reserved to meet a given PAPR threshold, the modulated data may only be mapped to the top 94% subcarriers (e.g., based on received energy and/or power), leaving the bottom 6% reserved. After application of IFFT, the resulting downlink communication may be transmitted to the UE.

The UE may receive the downlink communication as radio frequency (RF) signals, and may use analog to digital conversion (ADC), using a configured number of bits, to provide digital output to a digital front end (DFE) of the UE. The UE may then apply a fast Fourier transform (FFT) algorithm to convert the received signals to a frequency domain and obtain the UE downlink communication (e.g., DMRSs).

The UE may use the downlink communication (e.g., DMRS) to estimate the channel (e.g., an energy, capacity, and/or power of the subcarriers of the channel using, for example, SINR). The UE may use a channel estimate to correct for errors in the downlink communication and to decode data of the downlink communication.

In this way, the base station and UE may communicate using tone reservation without the need to transmit reports to identify specific subcarriers to which tone reservation is to be applied. This may reduce overhead associated with the use of tone reservation by obviating the need to transmit reports for tone reservation, which may increase throughput between the UE and base station. In addition, the application of tone reservation may lead to an improved PAPR, which may conserve resources that the UE uses to receive (e.g., demodulate, decode, and/or the like) the downlink transmission and may also lead to improved efficiency of power amplification at the base station (e.g., by conserving power that would otherwise be used to transmit reserved subcarriers).

As indicated above, FIG. 6 is provided as an example. Other examples may differ from what is described with respect to FIG. 6.

Figure 7:
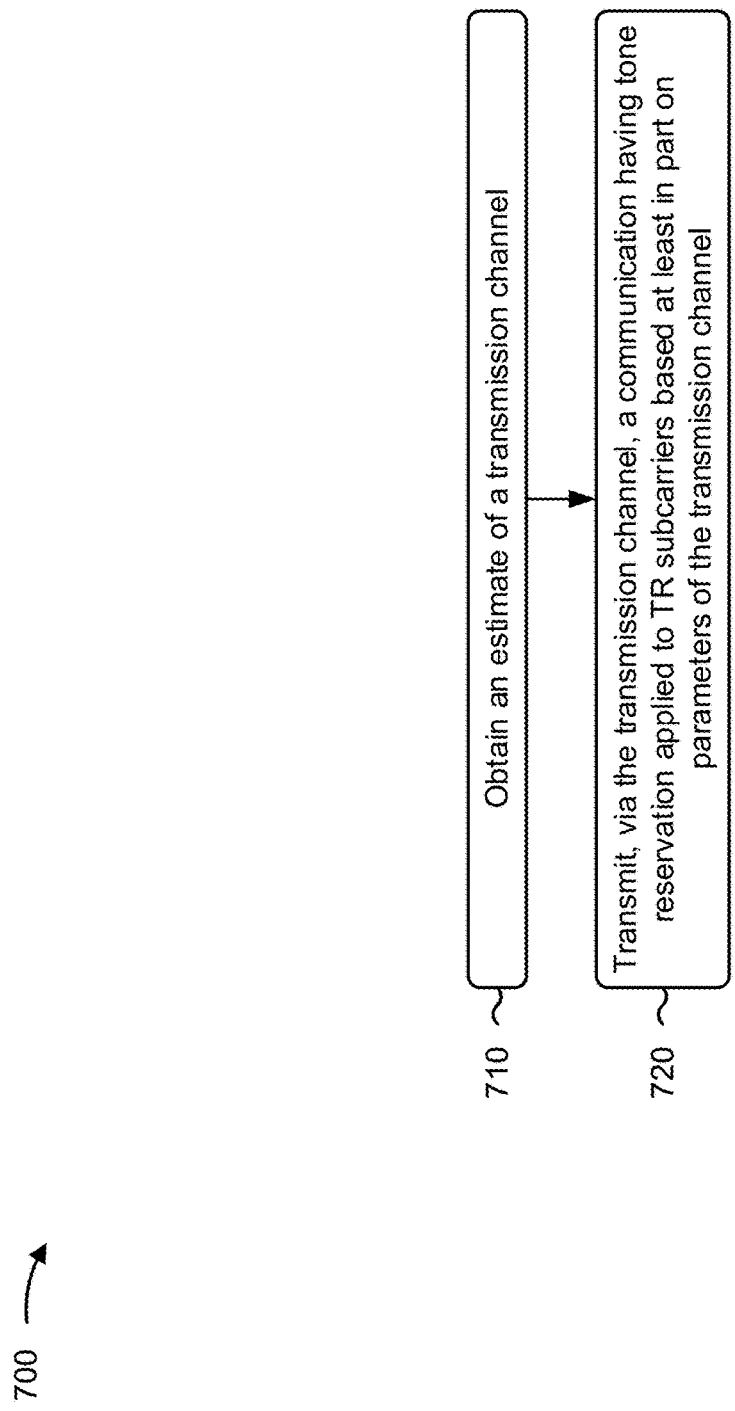
FIG. 7 is a diagram illustrating an example process associated with channel aware tone reservation, in accordance with the present disclosure.

FIG. 7 is a diagram illustrating an example process 700 performed, for example, by a transmitter device, in accordance with the present disclosure. Example process 700 is an example where the transmitter device (e.g., base station 110 or UE 120) performs operations associated with channel aware tone reservation.

As shown in FIG. 7, in some aspects, process 700 may include obtaining an estimate of a transmission channel (block 710). For example, the transmitter device (e.g., using communication manager 808, depicted in FIG. 8) may obtain an estimate of a transmission channel, as described above.

As further shown in FIG. 7, in some aspects, process 700 may include transmitting, via the transmission channel, a communication having tone reservation applied to TR subcarriers based at least in part on parameters of the transmission channel (block 720). For example, the transmitter device (e.g., using communication manager 808 and/or transmission component 804, depicted in FIG. 8) may transmit, via the transmission channel, a communication having tone reservation applied to TR subcarriers based at least in part on parameters of the transmission channel, as described above.

Process 700 may include additional aspects, such as any single aspect or any combination of aspects described below and/or in connection with one or more other processes described elsewhere herein.

In a first aspect, obtaining the estimate of the transmission channel comprises one or more of determining the estimate of the transmission channel based at least in part on reception, from a receiver device, of a measurement report indicating a channel response of the transmission channel, or determining the estimate of the transmission channel based at least in part on a measurement of one or more signals from the receiver device received via a reception channel.

In a second aspect, the measurement report indicating the channel response of the transmission channel comprises an indication of a receive quality associated with subcarriers of the transmission channel.

In a third aspect, the measurement report indicating the channel response of the transmission channel comprises indications of one or more parameters associated with sub-bands of the transmission channel.

In a fourth aspect, process 700 includes generating the communication having tone reservation applied to the TR subcarriers based at least in part on the parameters of the transmission channel.

In a fifth aspect, transmitting the communication having the tone reservation applied to the TR subcarriers comprises transmitting the communication having tone reservation applied to the TR subcarriers without indicating that the communication has tone reservation applied.

In a sixth aspect, transmitting the communication having tone reservation applied to the TR subcarriers comprises transmitting the communication using a multiple input multiple output communication mode.

In a seventh aspect, process 700 includes one or more of applying a precoder to tone reservation signals transmitted via the TR subcarriers before performing digital precoding of the communication on multiple streams, applying a precoder to tone reservation signals transmitted via the TR subcarriers after performing digital precoding of the communication on multiple streams, or applying a precoder to tone reservation signals transmitted via the TR subcarriers to improve self-interference of multiple streams and a peak-to-average-power-ratio of the communication.

In an eighth aspect, process 700 includes generating the communication having tone reservation applied to the TR subcarriers based at least in part on parameters associated with the TR subcarriers on multiple streams.

In a ninth aspect, the parameters associated with the TR subcarriers indicate one or more of channeling capacity percentiles associated with the TR subcarriers, capacities of the TR subcarriers, energy percentiles associated with the TR subcarriers, energies of the TR subcarriers, channeling covariance determinants of the TR subcarriers, channeling covariance condition numbers of the TR subcarriers, or channeling covariance eigenvalues of the TR subcarriers.

In a tenth aspect, process 700 includes selecting a TR signal to apply to the TR subcarriers based at least in part on the parameters of the transmission channel.

In an eleventh aspect, process 700 includes applying tone reservation to the TR subcarriers based at least in part on the TR subcarriers having an estimated lowest received energy of subcarriers of the communication.

In a twelfth aspect, process 700 includes applying tone reservation to the TR subcarriers based at least in part on application of the tone reservation to the TR subcarriers improving a peak-to-average-power-ratio of the communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
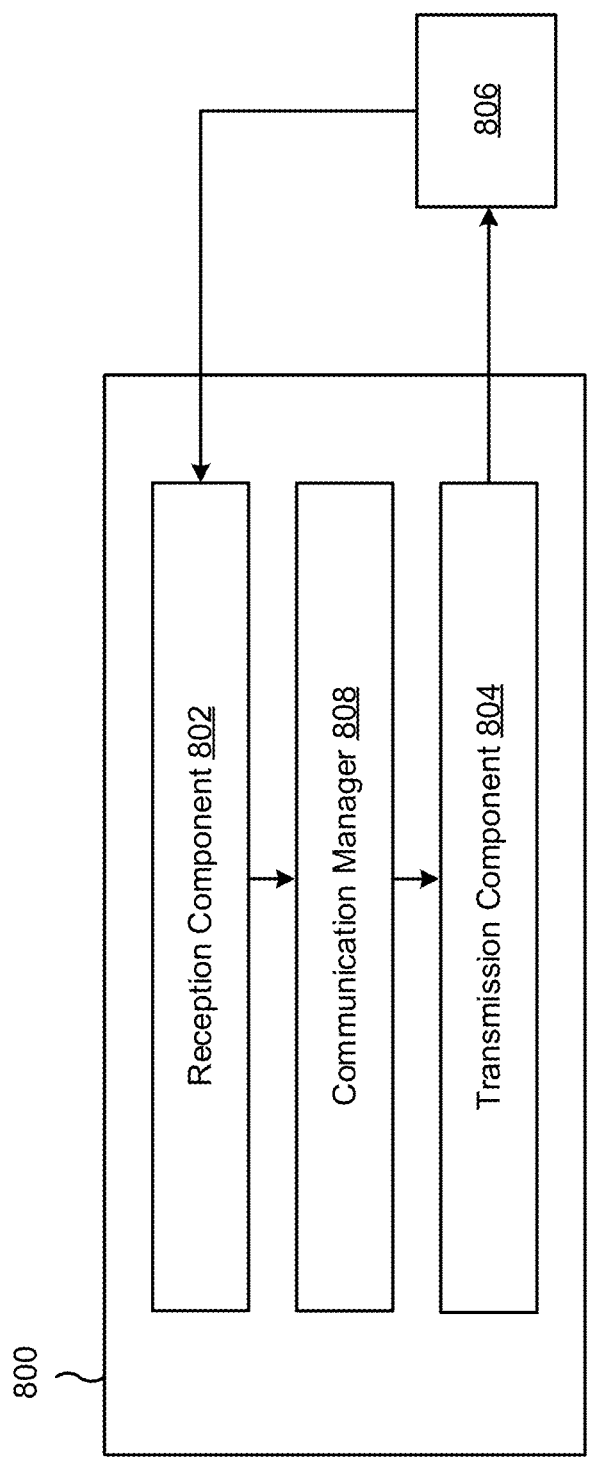
FIG. 8 is a block diagram of an example apparatus for wireless communication, in accordance with the present disclosure.

FIG. 8 is a block diagram of an example apparatus 800 for wireless communication. The apparatus 800 may be a transmitter device, or a transmitter device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 808. The communication manager 8) may include a communication manager 808 (e.g., communication manager 140).

In some aspects, the apparatus 800 may be configured to perform one or more operations described herein in connection with FIGS. 4-6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the transmitter device described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the transmitter device described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the transmitter device described above in connection with FIG. 2. In some aspects, the transmission component 804 may be co-located with the reception component 802 in a transceiver.

The communication manager 808 may obtain an estimate of a transmission channel. The transmission component 804 may transmit, via the transmission channel, a communication having tone reservation applied to TR subcarriers based at least in part on parameters of the transmission channel.

The communication manager 808 may generate the communication having tone reservation applied to the TR subcarriers based at least in part on the parameters of the transmission channel.

The communication manager 808 may generate the communication having tone reservation applied to the TR subcarriers based at least in part on parameters associated with the TR subcarriers on multiple streams.

The communication manager 808 may select a TR signal to apply to the TR subcarriers based at least in part on the parameters of the transmission channel.

The communication manager 808 may apply tone reservation to the TR subcarriers based at least in part on the TR subcarriers having an estimated lowest received energy of subcarriers of the communication.

The communication manager 808 may apply tone reservation to the TR subcarriers based at least in part on application of the tone reservation to the TR subcarriers improving a peak-to-average-power-ratio of the communication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a transmitter device, comprising: obtaining an estimate of a transmission channel; and transmitting, via the transmission channel, a communication having tone reservation applied to tone reservation (TR) subcarriers based at least in part on parameters of the transmission channel.

Aspect 2: The method of Aspect 1, wherein obtaining the estimate of the transmission channel comprises one or more of: determining the estimate of the transmission channel based at least in part on reception, from a receiver device, of a measurement report indicating a channel response of the transmission channel, or determining the estimate of the transmission channel based at least in part on a measurement of one or more signals from the receiver device received via a reception channel.

Aspect 3: The method of Aspect 2, wherein the measurement report indicating the channel response of the transmission channel comprises an indication of a receive quality associated with subcarriers of the transmission channel.

Aspect 4: The method of any of Aspects 2-3, wherein the measurement report indicating the channel response of the transmission channel comprises indications of one or more parameters associated with sub-bands of the transmission channel.

Aspect 5: The method of any of Aspects 1-4, further comprising: generating the communication having tone reservation applied to the TR subcarriers based at least in part on the parameters of the transmission channel.

Aspect 6: The method of any of Aspects 1-5, wherein transmitting the communication having the tone reservation applied to the TR subcarriers comprises: transmitting the communication having tone reservation applied to the TR subcarriers without indicating that the communication has tone reservation applied.

Aspect 7: The method of any of Aspects 1-6, wherein transmitting the communication having tone reservation applied to the TR subcarriers comprises: transmitting the communication using a multiple input multiple output communication mode.

Aspect 8: The method of Aspect 7, further comprising one or more of: applying a precoder to tone reservation signals transmitted via the TR subcarriers before performing digital precoding of the communication on multiple streams; applying a precoder to tone reservation signals transmitted via the TR subcarriers after performing digital precoding of the communication on multiple streams; or applying a precoder to tone reservation signals transmitted via the TR subcarriers to improve self-interference of multiple streams and a peak-to-average-power-ratio of the communication.

Aspect 9: The method of any of Aspects 7-8, further comprising generating the communication having tone reservation applied to the TR subcarriers based at least in part on parameters associated with the TR subcarriers on multiple streams.

Aspect 10: The method of Aspect 9, wherein the parameters associated with the TR subcarriers indicate one or more of: channel capacity percentiles associated with the TR subcarriers, capacities of the TR subcarriers, energy percentiles associated with the TR subcarriers, energies of the TR subcarriers, channel covariance determinants of the TR subcarriers, channel covariance condition numbers of the TR subcarriers, or channel covariance eigenvalues of the TR subcarriers.

Aspect 11: The method of any of Aspects 1-10, further comprising: selecting a TR signal to apply to the TR subcarriers based at least in part on the parameters of the transmission channel.

Aspect 12: The method of any of Aspects 1-11, further comprising: applying tone reservation to the TR subcarriers based at least in part on the TR subcarriers having an estimated lowest received energy of subcarriers of the communication.

Aspect 13: The method of any of Aspects 1-12, further comprising applying tone reservation to the TR subcarriers based at least in part on application of the tone reservation to the TR subcarriers improving a peak-to-average-power-ratio of the communication.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter device for wireless communication, comprising:
    a memory; and
    one or more processors, coupled to the memory, configured to:
        obtain an estimate of a transmission channel, the estimate comprising energies and capacities associated with a plurality of subcarriers of the transmission channel; and
        transmit, via the transmission channel, a communication having tone reservation applied to a quantity of subcarriers of the plurality of subcarriers based at least in part on parameters of the transmission channel, the parameters comprising the energies and the capacities associated with the plurality of subcarriers of the transmission channel, the quantity of subcarriers comprising:
            a configured quantity of subcarriers, of the plurality of subcarriers, with a lowest energy, capacity, or power;
            a configured fraction or a configured percentage of the plurality of subcarriers; or
            a set of subcarriers satisfying a threshold power.

2. The transmitter device of claim 1, wherein the one or more processors, to obtain the estimate of the transmission channel, are configured to:
    determine the estimate of the transmission channel based at least in part on reception, from a receiver device, of a measurement report indicating a channel response of the transmission channel.

3. The transmitter device of claim 2, wherein the measurement report indicating the channel response of the transmission channel comprises an indication of a receive quality associated with the plurality of subcarriers of the transmission channel.

4. The transmitter device of claim 2, wherein the measurement report indicating the channel response of the transmission channel comprises indications of one or more parameters associated with sub-bands of the transmission channel.

5. The transmitter device of claim 1, wherein the one or more processors are further configured to:
    generate the communication having the tone reservation applied to the quantity of subcarriers based at least in part on the parameters of the transmission channel.

6. The transmitter device of claim 1, wherein the one or more processors, to transmit the communication having the tone reservation applied to the quantity of subcarriers, are configured to:
    transmit the communication having the tone reservation applied to the quantity of subcarriers without indicating that the communication has tone reservation applied.

7. The transmitter device of claim 1, wherein the one or more processors, to transmit the communication having the tone reservation applied to the quantity of subcarriers, are configured to:
    transmit the communication using a multiple input multiple output communication mode.

8. The transmitter device of claim 7, wherein the one or more processors are further configured to one or more of:
    apply a precoder to tone reservation signals transmitted via the quantity of subcarriers before performing digital precoding of the communication on multiple streams;
    apply a precoder to tone reservation signals transmitted via the quantity of subcarriers after performing digital precoding of the communication on multiple streams; or
    apply a precoder to tone reservation signals transmitted via the quantity of subcarriers to improve self-interference of multiple streams and a peak-to-average-power-ratio of the communication.

9. The transmitter device of claim 7, wherein the one or more processors are further configured to:
    generate the communication having the tone reservation applied to the quantity of subcarriers based at least in part on parameters associated with the quantity of subcarriers on multiple streams.

10. The transmitter device of claim 9, wherein the parameters associated with the quantity of subcarriers indicate one or more of:
    channel capacity percentiles associated with the quantity of subcarriers,
    capacities of the quantity of subcarriers,
    energy percentiles associated with the quantity of subcarriers,
    energies of the quantity of subcarriers,
    channel covariance determinants of the quantity of subcarriers,
    channel covariance condition numbers of the quantity of subcarriers, or
    channel covariance eigenvalues of the quantity of subcarriers.

11. The transmitter device of claim 1, wherein the one or more processors are further configured to:
    select a tone reservation signal to apply to the quantity of subcarriers based at least in part on the parameters of the transmission channel.

12. The transmitter device of claim 1, wherein the one or more processors are further configured to:

apply the tone reservation to the quantity of subcarriers based at least in part on the quantity of subcarriers having an estimated lowest received energy of the plurality of subcarriers.

13. The transmitter device of claim 1, wherein the one or more processors are further configured to apply the tone reservation to the quantity of subcarriers based at least in part on application of the tone reservation to the quantity of subcarriers improving a peak-to-average-power-ratio of the communication.

14. The transmitter device of claim 1, wherein the one or more processors, to obtain the estimate of the transmission channel, are configured to:
 determine the estimate of the transmission channel based at least in part on a measurement of one or more signals from a receiver device received via a reception channel.

15. A method of wireless communication performed by a transmitter device, comprising:
 obtaining an estimate of a transmission channel, the estimate comprising energies and capacities associated with a plurality of subcarriers of the transmission channel; and
 transmitting, via the transmission channel, a communication having tone reservation applied to a quantity of subcarriers of the plurality of subcarriers based at least in part on parameters of the transmission channel, the parameters comprising the energies and the capacities associated with the plurality of subcarriers of the transmission channel, the quantity of subcarriers comprising:
  a configured quantity of subcarriers, of the plurality of subcarriers, with a lowest energy, capacity, or power;
  a configured fraction or a configured percentage of the plurality of subcarriers; or
  a set of subcarriers satisfying a threshold power.

16. The method of claim 15, wherein obtaining the estimate of the transmission channel comprises:
 determining the estimate of the transmission channel based at least in part on reception, from a receiver device, of a measurement report indicating a channel response of the transmission channel.

17. The method of claim 16, wherein the measurement report indicating the channel response of the transmission channel comprises an indication of a receive quality associated with subcarriers of the transmission channel.

18. The method of claim 16, wherein the measurement report indicating the channel response of the transmission channel comprises indications of one or more parameters associated with sub-bands of the transmission channel.

19. The method of claim 15, further comprising:
 generating the communication having the tone reservation applied to the quantity of subcarriers based at least in part on the parameters of the transmission channel.

20. The method of claim 15, wherein transmitting the communication having the tone reservation applied to the quantity of subcarriers comprises:
 transmitting the communication having the tone reservation applied to the quantity of subcarriers without indicating that the communication has tone reservation applied.

21. The method of claim 15, wherein transmitting the communication having the tone reservation applied to the quantity of subcarriers comprises:
 transmitting the communication using a multiple input multiple output communication mode.

22. The method of claim 21, further comprising one or more of:

applying a precoder to tone reservation signals transmitted via the quantity of subcarriers before performing digital precoding of the communication on multiple streams;
 applying a precoder to tone reservation signals transmitted via the quantity of subcarriers after performing digital precoding of the communication on multiple streams; or
 applying a precoder to tone reservation signals transmitted via the quantity of subcarriers to improve self-interference of multiple streams and a peak-to-average-power-ratio of the communication.

23. The method of claim 21, further comprising:
 generating the communication having the tone reservation applied to the quantity of subcarriers based at least in part on parameters associated with the quantity of subcarriers on multiple streams.

24. The method of claim 23, wherein the parameters associated with the quantity of subcarriers indicate one or more of:
 channel capacity percentiles associated with the quantity of subcarriers,
 capacities of the quantity of subcarriers,
 energy percentiles associated with the quantity of subcarriers,
 energies of the quantity of subcarriers,
 channel covariance determinants of the quantity of subcarriers,
 channel covariance condition numbers of the quantity of subcarriers, or
 channel covariance eigenvalues of the quantity of subcarriers.

25. The method of claim 15, further comprising:
 selecting a tone reservation signal to apply to the quantity of subcarriers based at least in part on the parameters of the transmission channel.

26. The method of claim 15, further comprising:
 applying the tone reservation to the quantity of subcarriers based at least in part on the quantity of subcarriers having an estimated lowest received energy the plurality of subcarriers.

27. The method of claim 15, further comprising applying the tone reservation to the quantity of subcarriers based at least in part on application of the tone reservation to the quantity of subcarriers improving a peak-to-average-power-ratio of the communication.

28. The method of claim 15, wherein obtaining the estimate of the transmission channel comprises:
 determining the estimate of the transmission channel based at least in part on a measurement of one or more signals from a receiver device received via a reception channel.

29. A non-transitory computer-readable medium storing a set of instructions for wireless communication, the set of instructions comprising:
 one or more instructions that, when executed by one or more processors of a transmitter device, cause the transmitter device to:
  obtain an estimate of a transmission channel, the estimate comprising energies and capacities associated with a plurality of subcarriers of the transmission channel; and
  transmit, via the transmission channel, a communication having tone reservation applied to a quantity of subcarriers of the plurality of subcarriers based at least in part on parameters of the transmission channel, the parameters comprising the energies and the capacities associated with the plurality of subcarriers of the transmission channel, the quantity of subcarriers comprising:
- a configured quantity of subcarriers, of the plurality of subcarriers, with a lowest energy, capacity, or power;
- a configured fraction or a configured percentage of the plurality of subcarriers; or
- a set of subcarriers satisfying a threshold power.

30. An apparatus for wireless communication, comprising:
- means for obtaining an estimate of a transmission channel, the estimate comprising energies and capacities associated with a plurality of subcarriers of the transmission channel; and
- means for transmitting, via the transmission channel, a communication having tone reservation applied to a quantity of subcarriers of the plurality of subcarriers based at least in part on parameters of the transmission channel, the parameters comprising the energies and the capacities associated with the plurality of subcarriers of the transmission channel, the quantity of subcarriers comprising:
  - a configured quantity of subcarriers, of the plurality of subcarriers, with a lowest energy, capacity, or power;
  - a configured fraction or a configured percentage of the plurality of subcarriers; or
  - a set of subcarriers satisfying a threshold power.

* * * * *